US008500480B2

(12) United States Patent
van Beveren et al.

(10) Patent No.: US 8,500,480 B2
(45) Date of Patent: Aug. 6, 2013

(54) CENTRALIZED ELECTRICAL DISTRIBUTION SYSTEM

(75) Inventors: Steven M. van Beveren, Kelowna (CA); Henry A. Roemer, Kelowna (CA)

(73) Assignee: Dirtt Environmental Solutions, Calgary (CA)

( * ) Notice: Subject to any disclaimer, the term of this patent is extended or adjusted under 35 U.S.C. 154(b) by 0 days.

(21) Appl. No.: 13/453,774

(22) Filed: Apr. 23, 2012

(65) Prior Publication Data

US 2012/0204418 A1    Aug. 16, 2012

Related U.S. Application Data

(63) Continuation of application No. 12/594,343, filed as application No. PCT/CA2009/000802 on Jun. 5, 2009, now Pat. No. 8,162,686.

(51) Int. Cl.
*H01R 13/625*    (2006.01)
*H01R 4/50*    (2006.01)

(52) U.S. Cl.
USPC ............................................ 439/345

(58) Field of Classification Search
USPC ............................................ 439/345
See application file for complete search history.

(56) References Cited

U.S. PATENT DOCUMENTS

| | | | |
|---|---|---|---|
| 2,107,865 A * | 2/1938 | Jackson | 174/51 |
| 4,408,820 A | 10/1983 | Eaby | |
| D317,297 S | 6/1991 | Reed | |
| D327,253 S | 6/1992 | Marach | |
| 5,997,341 A | 12/1999 | Ushiyama | |
| D555,106 S | 11/2007 | Pape | |
| 7,386,424 B2 * | 6/2008 | DeBoer et al. | 702/188 |
| 7,648,379 B2 * | 1/2010 | Johnson et al. | 439/215 |
| D659,648 S | 5/2012 | Isaacks | |
| D660,805 S | 5/2012 | Azzola | |
| 2009/0227123 A1 | 9/2009 | Paya | |
| 2010/0266117 A1 | 10/2010 | Enge | |
| 2011/0230075 A1 | 9/2011 | Van Beveren | |

FOREIGN PATENT DOCUMENTS

JP    11031545    1/2003

OTHER PUBLICATIONS

International Search Report and Opinion for PCT/CA2009/000802, filed Jun. 5, 2009, (Received Mar. 9, 2010).

* cited by examiner

*Primary Examiner* — Javaid Nasri
(74) *Attorney, Agent, or Firm* — Workman Nydegger

(57) ABSTRACT

Implementations of the present invention comprise systems, methods, and apparatus for distributing electric power to a plurality of access points within a plurality of spaces. In particular, implementations of the present invention allow for the distribution of electric power from a centralized panel manager, to one or more access points without the use of zone boxes. For example, a panel manager for distributing electric power in accordance with an implementation of the present invention can include a housing configured to allow at least one main input therein. The panel manager can also include a plurality of planar connection interfaces secured within the housing. The planar connection interface can be configured to mate with planar electrical connectors for the distribution of electric power to the plurality of access points.

20 Claims, 4 Drawing Sheets

CENTRALIZED ELECTRICAL DISTRIBUTION SYSTEM

CROSS-REFERENCE TO RELATED APPLICATIONS

The present invention is a Continuation of U.S. patent application Ser. No. 12/594,343, filed on Oct. 1, 2009, now U.S. Pat. No. 8,162,686, which is a U.S. National Stage Application corresponding to PCT/CA2009/00802, filed on Jun. 5, 2009, entitled "CENTRALIZED ELECTRICAL DISTRIBUTION SYSTEM." The entire content of each of the aforementioned applications is incorporated by reference herein.

BACKGROUND OF THE INVENTION

1. Technical Field

The present disclosure relates generally to systems, methods, and apparatus for distributing electric power.

2. Background and Relevant Art

Electrical connections are essential today for powering a wide range of electronic devices, such as computers, cell phones, heating/air-conditioning, microwaves, televisions, copiers, printers, and so forth. As the number of devices continues to increase, the need for connections to power these devices becomes more important and increasingly complex. Unfortunately, the means and mechanisms for providing electric power to various zones of a building to support such devices are also increasingly complex.

Typically, electrical contractors may provide branch (or horizontal) distribution of electric power in commercial spaces, or other large spaces, in one of two methods. The first method typically involves an electrical contractor distributing junction boxes as required by the electrical engineers circuited drawings throughout the space. Rigid conduit connects the electrical panel to the junction boxes. With the rigid conduit connecting the two points, the electrical contractor will pull wires through the rigid conduit and electrically connect the main electrical panel to the junction box. The electrical contractor repeats this procedure numerous times throughout the floor space.

The electrical contractor also distributes access points for the electric power, such as electric plugs or light fixtures, throughout the space. An electrical engineer or an architect dictates the location of the access points. The electrical contractor completes the connection between the access point and the junction box by hardwiring the two together. This method of distribution provides the end user with their electrical needs at the time of initial design and installation; however, if the end user requires any changes in electrical distribution within the space after initial installation, the changes may require the removal of these materials and the installation of new materials.

The second method involves the use of modular components placed in a zone type of layout to provide branch distribution of electric power in a commercial space, or other large space. The electrical contractor places individual zone boxes throughout the space, typically on some sort of pattern or grid (normally 20 feet on center). The electrical contractor hard mounts these zone boxes to the building floor or ceiling then connects the zone boxes to the electrical panel via a hard wired connection to the electrical panel, using either pipe and wire or metal clad cable.

This method, while usually better than the first method, is still somewhat restrictive regarding downstream flexibility and change when renovations and new locations of power access points are required. For example, modular and movable connections and access points are only available from the zone box onward. In other words, this method only provides a modular solution from each of the zone boxes onward, with conventionally installed electrical wiring providing the portion of the electric power from the circuit breaker panel to the zone boxes.

Further, in this current method, the electrical contractor often installs access panels to provide access to the zone boxes. These access panels are intended to provide a means for the tenant to make future changes as needed. Access panels may be installed in raised floors, lowered ceilings or in other areas where a large amount of electric wiring is anticipated. Nevertheless, access to zone boxes may be restricted or impaired due to the installation of walls, furniture or other obstructions after the installation of the zone boxes themselves. This limits or impedes the ability to add or reconfigure the circuiting of the installed zone box.

Both such current methods thus tend to suffer from a variety of problems that make them undesirable and increase the cost and time of installation. One problem is that both methods tend to be labor intensive. For example, electrical contractors often determine the path the conduit and wire will take from the breaker panel to the junction box or zone box based on physical site conditions without consideration to the tenant's future requirements. The plans provided by the electrical engineer or architect are then revised to reflect the 'as-built' condition.

Another problem is that the division of labor, especially in commercial buildings, is difficult to ascertain. This problem arises because statutes, including the tax code, and other conventions in various locales, often divide the labor, and the budget for paying for the labor, between the base building and the tenant. Nevertheless, it remains unclear where building improvements and tenant improvements end and who is, therefore, responsible for their supply and installation.

Still another problem with such conventional approaches is that these methods of installation often result in either under-capacity (junction box approach) or over-capacity (zone box approach). Both under-capacity and over-capacity may occur because it is difficult to ascertain what future electrical needs to plan for. Under-installation may result in costly, time-consuming, rework. Over-installation may inflate costs and result in the nonuse of installed materials.

Accordingly, there are a number of difficulties in current electrical distribution within spaces, particularly large spaces, which can be addressed.

BRIEF SUMMARY OF THE INVENTION

Implementations of the present invention comprise systems, methods, and apparatus for distributing electric power to a plurality of access points. In particular, implementations of the present invention allow for the distribution of electric power from a single distribution apparatus, such as a centralized panel manager, to one or more access points. More specifically, implementations of the present invention allow for distribution of electrical power without the use of zone boxes. Accordingly, current electrical layouts, and future changes in the electrical layout of a space, including additions of further access points, can be accomplished with minimum effort and costs, particularly compared with conventional mechanisms and apparatus.

For example, a panel manager for distributing electric power in accordance with an implementation of the present invention can include a housing configured to allow at least one main input therein. The main input receives electric power from an outside electrical supply. The panel manager can also include a plurality of planar connection interfaces secured within the housing. The plurality of planar connection interfaces are configured to pass electric power from the main input to one or more electrical access points via a planar electrical connector, which, in turn, is configured to mate with one of the planar connection interfaces.

Additionally, a planar electrical connector in accordance with an implementation of the present invention can include a conductive, planar surface comprising opposing front and back surfaces. The planar electrical connector can also include opposed first and second ridges that are perpendicular to the front and back surfaces of the planar surface. Additionally, the planar electrical connector can include a clamshell connector connected to the front surface to secure one or more electrical wires to the planar surface. The planar electrical connector can further include one or more openings formed within the planar surface. The one or more openings can receive one or more releasable extensions for releasably securing the planar electrical connector to a planar connection interface in a panel manager.

Further, a method of providing electric power in accordance with an implementation of the present invention can include identifying a building layout comprising a plurality of spaces. The method can further include identifying a single distribution room for distributing power to each of the plurality of spaces. Additionally, the method can include providing a panel manager in a distribution room. Further, the method can include connecting a plurality of access points in the plurality of spaces directly to the panel manager, and without use of any intervening zone boxes.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to comprise systems, methods, and apparatus for distributing electric power to a plurality of access points. In particular, implementations of the present invention allow for the distribution of electric power from a single distribution apparatus, such as a centralized panel manager, to one or more access points. More specifically, implementations of the present invention allow for distribution of electrical power without the use of zone boxes. Accordingly, current electrical layouts, and future changes in the electrical layout of a space, including additions of further access points, can be accomplished with minimum effort and costs, particularly compared with conventional mechanisms and apparatus.

Accordingly, one will appreciate that various advantages can be achieved by using a panel manager for the distribution of power to a plurality of access points. For example, use of a panel manager provides a clear demarcation of where the base building ends and where tenant improvements begin, simplifying budget and tax analyses. Additionally, design costs may be reduced since the need to have an architect or electrical engineer layout the electrical design can be eliminated. Specifically, an electrical contractor, or other on-site installer, can decide the best method for providing the wiring to the access points.

Figure 1:
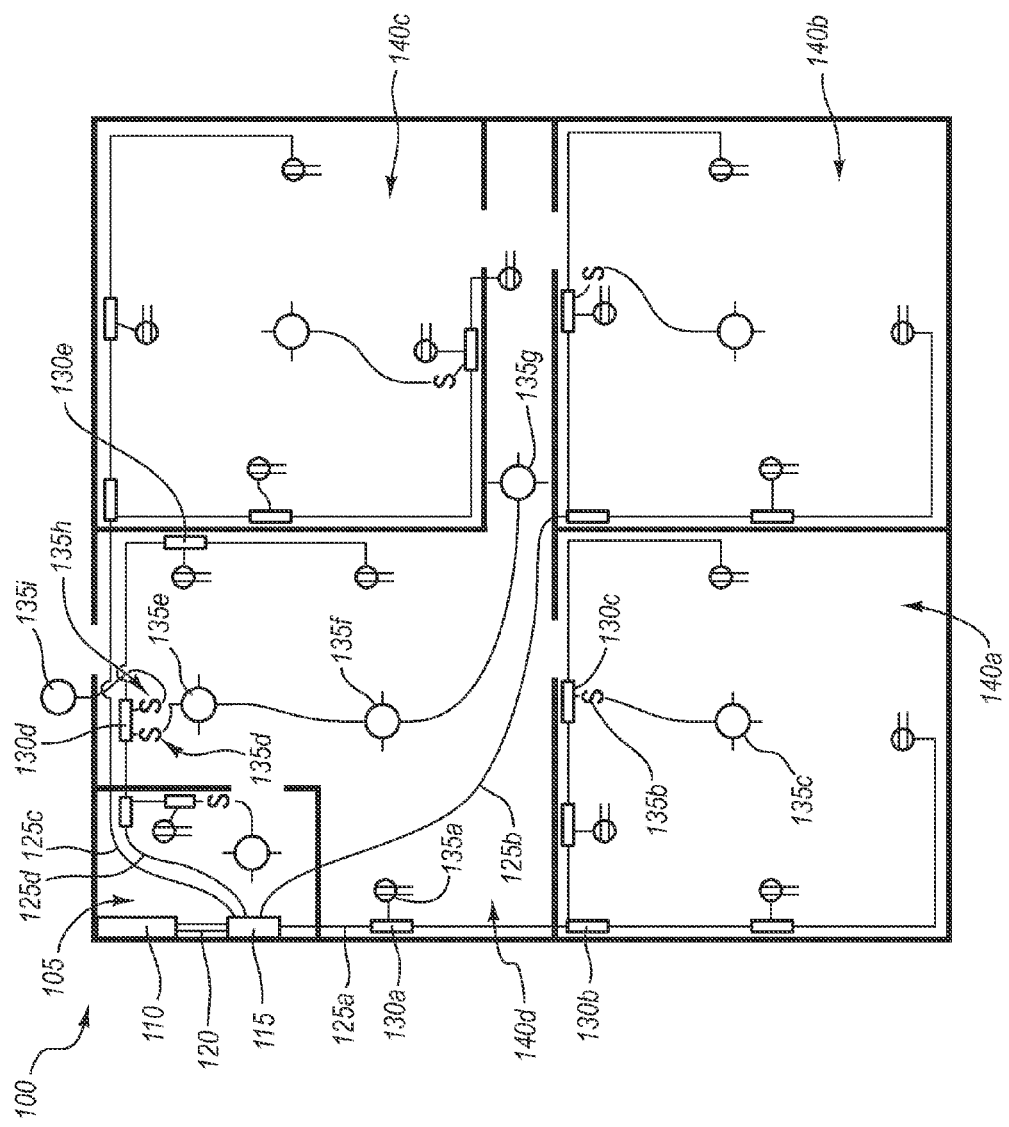
FIG. 1 illustrates an example of an electrical layout that can be achieved using a centralized panel manager in accordance with an implementation of the present invention.

Along these lines, FIG. 1 illustrates an example of a building space that implements a particular electrical layout 100 using a centralized panel manager (e.g., 115) in accordance with an implementation of the present invention. Along these lines, FIG. 1 shows that, in this electrical layout 100, a single panel manager 115 distributes electric power from one main input 110 to a plurality of access points 135 (e.g., 135a, 135b, 135c). In general, an "access point" comprises one or more locations where a user can access electric power. Access points 135 can include outlets, light fixtures, switches, and splitters, or any other device whereby a user can access electric power.

The access points 135 can correspondingly reside in a plurality of spaces 140 (e.g., 140a, 140b, 140c). The plurality of spaces 140 can include different rooms within a building, or a floor of a building. Nevertheless, access points 135 need not be within a building or on a single floor of a building, as such. For example, the plurality of spaces 140 can include multiple buildings or enclosures near one another. Alternatively, the plurality of spaces 140 can include multiple cubicles or areas within a single room. Additionally, the plurality of spaces 140 can include access points that are exterior to a building. For example, the access points 135 can include external plugs, external switches or external light fixtures.

In at least one implementation, the electrical layout 100 includes a centralized distribution room 105. For the purposes of this specification and claims, a "centralized distribution room" means a room that serves as a single point of electrical distribution for a plurality of access points 135 within a plurality of spaces 140, without requiring any intervening zone boxes. Thus, one will appreciate that a single, centralized distribution room 105 (or "distribution room") can receive electric power and distribute the electric power to other areas, i.e., the plurality of spaces 140.

In at least one implementation, the distribution room 105 can include an electrical room, which comprises a room or space in a building dedicated to electrical equipment. The size of the distribution room 105 can be proportional to the size of the space to which electric power will be provided. Equipment in a distribution room 105 can thus include any number or type of electric switchboards, distribution boards, circuit breakers, circuit disconnects, an electric meter, transformers, busbars, backup batteries, backup generators, an electric substation, fire alarm control panels, distribution frames and any other equipment necessary for the distribution of power throughout the plurality of spaces 140.

In at least one implementation, the distribution room 105 comprises an electric power source 110 therein, or otherwise access thereto. In such an implementation, the electric power source 110 can receive electric power from an external source. Additionally and alternatively, the electric power source 110 can generate power to distribute throughout the plurality of spaces 140. Accordingly, the electric power source 110 can also similarly include any number or type of electric switchboards, distribution boards, circuit breakers, circuit disconnects, an electric meter, transformers, busbars, backup batteries, backup generators, an electric substation or any other source of electric power. In at least one implementation, power source 110 comprises a "main input."

In at least one implementation, the distribution room 105 further comprises one or more centralized panel managers 115. As understood herein, a centralized panel manager 115 comprises one or more apparatus and components configured to provide electric power from one or more inputs (or a "main input") to a plurality of access points 135 within a plurality of spaces 140, and without requiring the use of one or more intervening zone boxes, as discussed below. For example, FIG. 1 shows that panel manager 115 receives electrical power (e.g., via one or more electric conduits 120) from power source 110, and distributes the electrical power directly to the plurality of access points 135 at least in the plurality of spaces 140.

In at least one implementation, the panel manager 115 distributes electric power to the plurality of access points 135 using one or more wires 125. For the purposes of this specification and claims, a "wire" means a device or apparatus which can be used for the distribution of electric power. For example, a wire 125 can refer to a twisted pair of wires, a bundle of individual strands, a cable, a shielded cable, a multicore cable, a ribbon cable, or any other device or apparatus comprising a pathway for the distribution of electric power.

For example, FIG. 1 shows a first wire 125a connected to the panel manager 115 for the distribution of electric power to a plurality of access points 135. In at least one implementation, the first wire 125a can connect to the panel manager 115 using a planar connection interface (e.g., 225, FIGS. 2 and 3C) and a planar electrical connector (e.g., 230, FIGS. 2 and 3A-3B), as described below. Additionally or alternatively, however, one will appreciate that the first wire 125a can connect to the panel manager 115 using any other method or connection interface, which allows for the transmission of electric power from the panel manager 115 to the first wire 125a, including the use of electromagnetic fields.

In at least one implementation, the first wire 125a can connect to a plurality of access points 135 indirectly via one or more splitters 130. As understood herein, a splitter 130 can include any device or apparatus which distributes electric power from one input to a plurality of outputs. For example, a splitter 130 can receive electric power from a wire 125 and output electric power to two outputs, three outputs or any greater number of outputs. A splitter 130 can distribute the electric power equally among the different outputs or unequally among the different outputs.

In at least one implementation, the splitter 130a can allow for a single first wire 125a connected to the panel manager 115 to supply electric power to a plurality of access points 135. For example, FIG. 1 shows that splitter 130a can connect directly or indirectly to the plurality of access points 135 (e.g., a, b, c). FIG. 1 further shows that wire 125a connects to splitter 130a, which connects, in turn, to access point 135a and to a second splitter 130b. FIG. 1 also shows that second splitter 130b, in turn, connects to access points 135b, 135c.

In at least one implementation, a splitter 130 can connect to a single type of output or can connect to multiple types of outputs. For example, the output of a splitter 130 can connect to additional splitters 130 or to access points 135. As illustrated in FIG. 1, for example, second splitter 130b distributes electric power to various additional access points 135 and splitters 130 in the space 140a.

In at least one implementation, access points 135 can be connected to one another without the use of an intervening splitter 130. For example, FIG. 1 shows that splitter 130c connects to access point 135b which is connected, in turn, to access point 135c. Connecting two or more access points 135 directly to one another can allow one access point 135 to control the flow of electric power to other access points 135.

In at least one implementation, a second wire 125b and third wire 125c can connect to the panel manager 115. The second wire 125b can connect to a plurality of access points 135 in space 140b, delivering electric power to the plurality of access points 135. The third wire 125c can, likewise, connect to a plurality of access points 135 in space 140c, delivering electric power thereto.

FIG. 1 also shows that fourth wire 125d connects to the panel manager 115. The fourth wire 125d delivers electric power to splitters 130 and a plurality of access points 135 in a fourth space 140d. Thus, the fourth space 140d can receive electric power directly from the centralized panel manager 115, and thus independent of the power received by the first space 140a, the second space 140b and the third space 140c.

As illustrated in FIG. 1, the splitter 130d can also include three outputs. In the illustrated case, at least one output of splitter 130d connects to access point 135d, which connects, in turn, to access points 135e, 135f and 135g. As shown in FIG. 1, this allows the second output of splitter 130d to connect to access points 135h and 135i. This further allows the third output of splitter 130d to connect to additional splitter 130e and additional access points 135. By placing the access points on different outputs of the splitter 130d, the various access points 135 can be controlled independent of one another, and without interrupting electric power to the access points connected to the other outputs of the splitter 130d.

Figure 2:
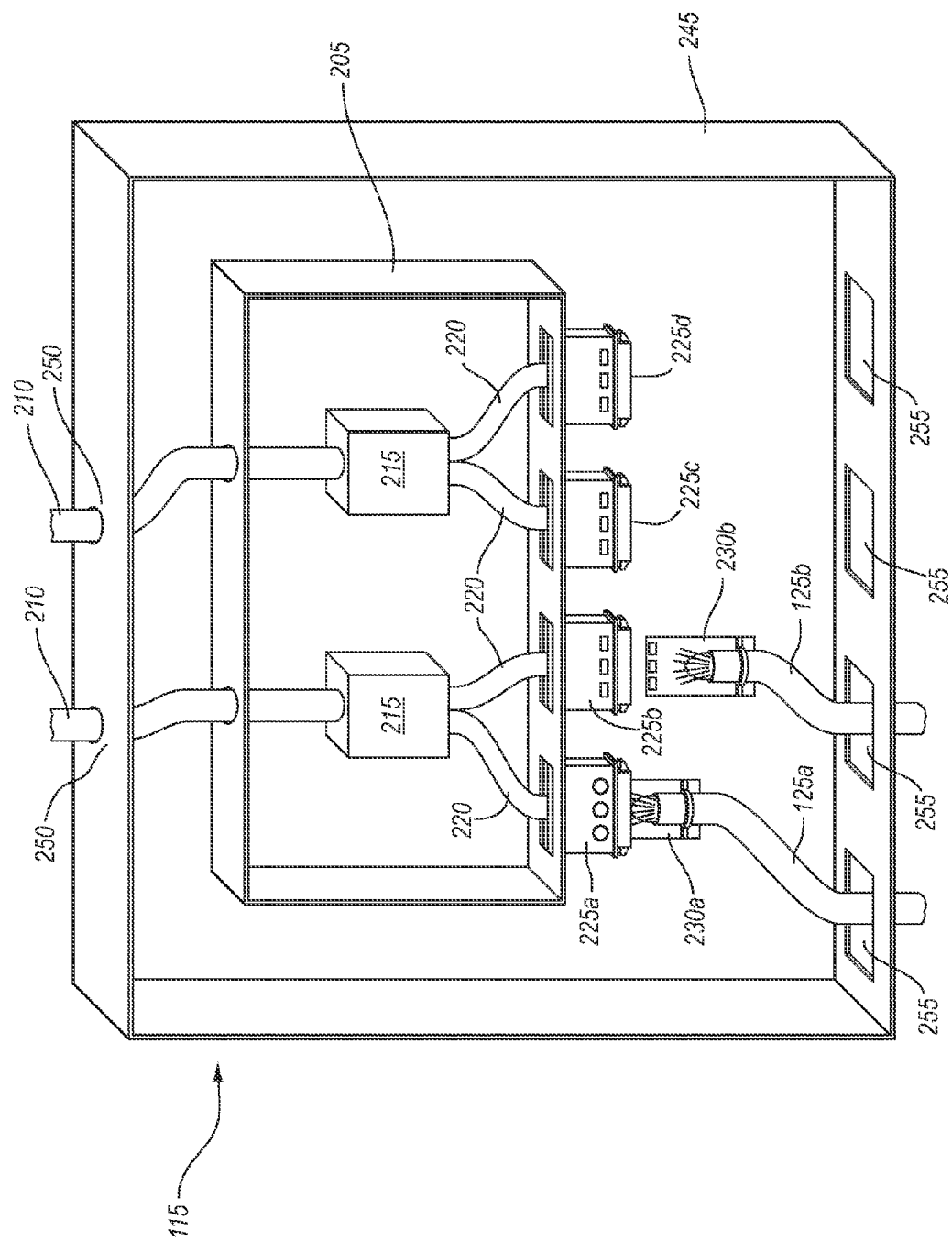
FIG. 2 illustrates a more detailed schematic of a panel manager, such as used to distribute electrical power in the electrical layout of FIG. 1.

FIG. 2 illustrates additional details of the exemplary panel manager 115 shown in the schematic layout of FIG. 1. As understood herein and discussed above, a panel manager 115 comprises one or more apparatus and components configured to provide electric power from one or more main inputs 210

(or 110, FIG. 1) to a plurality of access points 135 within a plurality of spaces 140, and without requiring the use of one or more intervening zone boxes. To aid in this functionality, FIG. 2 shows that at least one implementation of panel manager 115 can comprise a housing 205. In one implementation, housing 205 can protect the electronic circuitry of the panel manager 115. Additionally or alternatively, the housing 205 can protect electrical contractors or other individuals from injury by isolating exposed wiring or other hazardous material within the panel manager 115. Further, the housing 205 can ease installation of the panel manager 115 since the parts of the panel manager 115 can be assembled prior to installation.

FIG. 2 also show that, in at least one implementation, the housing 205 of the panel manager 115 can allow at least one main input 210 therein. The main input 210 can comprise a wire (e.g., 125) or other conductive pathway which allows for the transmission of electric power from an electrical power source external to the panel manager 115 to the panel manager 115. For example, the external electrical power source may comprise a transformer. Rigid conduit or a protective sheath can protect the main input 210. Nevertheless, protection of the main input 210 with rigid conduit or a protective sheath is not required.

FIG. 2 further shows that the housing 205 can secure a plurality of planar connection interfaces 225, which are described more fully below. In general, the planar connection interfaces 225 can pass electric power from the main input 210 and output the power to one or more electrical access points. A single planar connection interface 225 need not pass electric power to access points of a single type, as discussed above.

FIG. 2 also shows that, in at least one implementation, the panel manager 115 can also include one or more terminal assemblies 215 configured to receive electric power from the main input 210 and provide electric power for the plurality of planar connection interfaces 225. In one implementation, terminal assembly 215 can output the electric power to one or more planar connection interfaces 225 through wires 220 connected directly to the planar connection interfaces 225. Nevertheless, the terminal assembly 215 can also serve other functions, such as voltage conversion, current conversion or surge protection.

In addition, FIG. 2 shows that the planar connection interfaces 225 can mate with a planar electrical connector 230. In at least one implementation, mating can provide a conductive pathway between the planar connection interface 225 and the planar electrical connection 230. This conductive pathway can allow the transmission of electric power from the main input 210 of the panel manager to the planar electrical connector 230 via the planar connection interface 225. The planar electrical connector 230 can, in turn, connect to a wire 125, an electric cable or any other means for conducting electric power to one or more access points.

In at least one implementation, the planar connection interfaces 225 secured within the housing 205 of the panel manager 115 can be configured to mate with different planar electrical connectors 230, as discussed below. For example, the panel manager 115 can include a planar connection interface 225 configured to mate with a planar electrical connector 230 configured to attach to a 10-wire AC/MC cable. Additionally or alternatively, the panel manager 115 can include a planar connection interface 225 configured to mate with a planar electrical connector 230 configured to attach to an 8-wire AC/MC cable.

In at least one implementation, the panel manager 115 can include multiple types of planar connection interfaces 225. For example, FIG. 2 shows that the panel manager 115 can include a combination of planar connection interfaces 225(a, b, c, d). Of these, FIG. 2 shows that planar connection interface 225a is configured to mate with planar electrical connector 230a. Planar electrical connector 230a, in this case is further configured to attach to a 10-wire AC/MC cable. By contrast, FIG. 2 shows that planar connection interface 225b is configured to mate with planar electrical connector 230b, which in this case is attached to 8-wire AC/MC cables. Accordingly, one will appreciate that a particular type of wire 125 connection to the planar connectors 230 is not necessarily required.

In addition, one will appreciate that the planar connection interfaces 225 need not be permanently secured within the housing 205. For example, the panel manager 115 can be provided with openings in the housing 205 into which an electrical contractor can insert the necessary planar connection interfaces 225. Additionally or alternatively, the planar connection interfaces 225 can be removable to allow an electrical contractor to remove and replace planar connection interfaces 225 in the panel manager 115.

In addition to the foregoing, FIG. 2 shows that an enclosure 245 can contain the panel manager 115. For example, an electrical contractor can insert the panel manager 115 into the enclosure 245 during installation, or the panel manager 115 can be manufactured within the enclosure 245. The enclosure 245, in turn, can provide additional protection against electrical shock to a user or damage to components of the panel manager 115. For example, the planar connection interfaces 225, and consequently the planar electrical connectors 230 when mated, can reside on the exterior surface of the housing 205 of the panel manager 115. An enclosure 245 can, therefore, fully contain the planar connection interfaces 225 to prevent tampering or electrocution. Nevertheless, one will appreciate that the panel manager 115 can function effectively without the enclosure 245. Additionally or alternatively, other methods, devices and apparatus than enclosure 245 can contain the panel manager 115. In still further embodiments, enclosure 245 is removed entirely.

Figure 3B:
FIG. 3B illustrates an alternative embodiment of a planar electrical connector for use with a centralized panel manager in accordance with an implementation of the present invention.
Figure 3C:
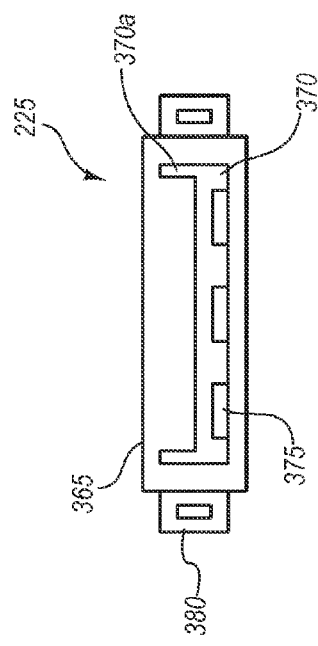
FIG. 3C illustrates an example embodiment of a planar connection in accordance with an implementation of the present invention which is used to receive a planar electrical connector such as shown in FIG. 3A or 3B.

In the event panel manager 115 includes such an enclosure 245, the enclosure 245 can include a door or other mechanism (not shown) to prevent unwanted access to the panel manager 115. The enclosure 245 can also include one or more openings 250 to allow insertion of the main input 210, and further include one or more openings 255 to allow insertion of the planar electrical connectors 230 and attached wires 125. With regard to the wires 125 attached therein, FIGS. 3A-3C illustrate example embodiments of planar electrical connectors 230a and 230b and a planar connection interface 225 that are used to connect the wires 125 to the panel manager 115.

Figure 3A:
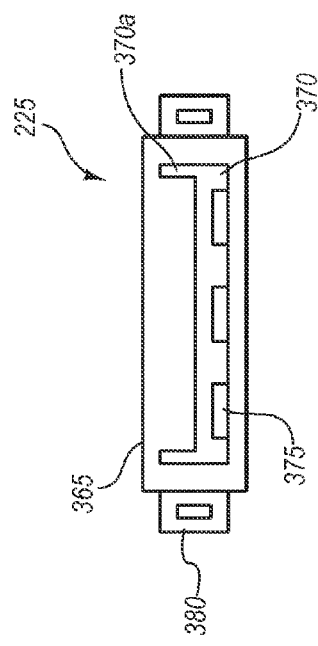
FIG. 3A illustrates an example embodiment of a planar electrical connector for use with the panel manager of FIGS. 1 and 2 in accordance with an implementation of the present invention.

For example, FIG. 3A illustrates an example embodiment of a planar electrical connector 230a to connect to a wire for the distribution of electric power to one or more access points (e.g., 135). FIG. 3A shows that the planar electrical connector 230a includes a planar surface 305a with opposing front and back surfaces. One will appreciate that the planar surface 305a can be an electrical conductor, such as by comprising one or more materials that contain movable electric charges. In at least one implementation, the planar surface 305a is metallic, such as copper, gold silver, or any other conductive metal. In other embodiments, the planar surface 305a is non-metallic, including conductive plastics, graphite or other conductive non-metallic materials.

FIGS. 3A (and 3B) further shows that the planar electrical connector 230(a, b) can include opposed first and second ridges 310a that are perpendicular to the front and back surfaces of the planar surface 305a. In one implementation, the first and second ridges 310a can include the same material as the planar surface 305a or can include different materials. The first and second ridges 310a can assist in providing a standard shape to the planar electrical connection 230a. A standard shape can ensure that a particular planar electrical connector 230a mates only with the proper planar connection interface.

Other aspects of the planar electrical connector 230a which can provide a standard shape can include the width of the planar electrical connector 230a, the length of the planar electrical connector 230a, the thickness of the planar surface 305a or any combination of the above. For example, the thickness of the planar surface 305a and the width of the planar electrical connector 230a can be varied to ensure that the planar electrical connector 230a is mated to only the proper planar connection interface.

FIGS. 3A through 3B further show that the planar electrical connector 230a can comprise a clamshell connector 315a connected to the front surface of the planar surface 305a. In general, the clamshell connector 315a comprises one or more openings to admit a wire. The clamshell connector 315a can further be configured to close, in order to hold the wire firmly in place. In one implementation, for example, the clamshell connector 315a can open and close manually or can include a mechanism, such as spring loading, for automatically opening and closing the clamshell connector 315a.

FIGS. 3A-3B further show that the planar electrical connector 230a can also include one or more openings 320(a, b) within the planar surface 305a. In one implementation, for example, the openings 320 are configured to receive one or more releasable extensions within a planar connection interface 225. For example, the releasable extensions can releasably secure the planar electrical connector 230 within the planar connection interface 225 in a panel manager, as described above, or in another device fitted with planar connection interfaces 225. The size of the openings 320, the shape of the openings 320, the number of openings 320, the placement of the openings 320 and other aspects of the openings 320a can ensure that the planar electrical connector 230 only mates with the appropriate planar connection interface 225.

Along these lines, FIG. 3B illustrates an alternative embodiment of a planar electrical connector 230b. For example, FIG. 3B shows that the planar electrical connector 230b includes a conductive planar surface 305b, as described above in connection with the planar electrical connector 230a of FIG. 3A. Nevertheless, the planar electrical connector 230b is configured to mate with a different type planar connection interface 225 than the planar electrical connector 230a of FIG. 3A. For example, the planar electrical connector 305b can be narrower and can have a different shape and spacing of the openings 320b than the planar electrical 230a connector of FIG. 3A.

Additionally, the planar electrical connector 230b can have a smaller clamshell connector 315b than the planar electrical connector 230a of FIG. 3A. The difference in size of the clamshell connector 315b can allow the planar electrical connector 230b to attach to a wire of smaller size than the planar electrical connector 230a of FIG. 3A. For example, as previously discussed, the clamshell connector 315a of the planar electrical connector 230a of FIG. 3A can be configured to attach to 10-wire AC/MC cable, while the clamshell connector 315b of the planar electrical connector 230b of FIG. 3B can be configured to attach to 8-wire AC/MC cable.

Additionally or alternatively, the first and second ridges 310b of the planar electrical connector can be of a different size or shape than the first and second ridges 310a of the planar electrical connector 230a of FIG. 3A. For example, the first and second ridges 310b can be taller or non-rectangular in shape when compared to the first and second ridges 310a of the planar electrical connector 230a of FIG. 3A.

FIG. 3C illustrates an example embodiment of a planar connection interface 225, which, as previously discussed, can be mounted within housing 205 for receipt of a planar connector 230(a, b). Accordingly, the planar connection interface 225 can be configured to mate with a particular planar electrical connector 230a or 230b, such as shown in FIGS. 3A-3B. In either case, when mated, the planar connection interface 225 and the planar electrical connector 230 form a conductive pathway. This conductive pathway can allow electric power to flow from any device attached to the planar connection interface 225 to a device attached to the planar electrical connector 230 and vice versa.

Accordingly, FIG. 3C shows that the planar connection interface 225 includes an outer surface 365. The outer surface 365 can include a conductive material such as metal, conductive plastics, graphite or other conductive materials. Alternatively, the outer surface 365 can include an insulating material such as glass, TEFLON, plastics, epoxy, fiberglass, ceramics, or any other material configured to resist the flow of electric current. Manufacturing the outer surface 365 with an insulating material can protect the conductive pathway between the planar connection interface 225 and a planar electrical connector 230. Additionally, manufacturing the outer surface 365 with an insulating material can protect individuals working with a planar connection interface 225 from accidental electrocution.

FIG. 3C further shows that the outer surface 365 can include a cavity 370 for inserting a planar electrical connector 230. The inside surface of the cavity 370 can be a conductive material that is in contact with the planar electrical connector 230, thus creating a conductive pathway between the planar connection interface 225 and the planar electrical connector 230. FIG. 3C also shows that the cavity 370 can include one or more notches 370a for receiving one or more ridges 310(a, b) on a planar electrical connector 230. The notches 370a can thus ensure that only the appropriate planar electrical connector 230 is inserted into the planar connection interface 225. Additionally, modification of the size and shape of the cavity 370 can ensure that the planar connection interface 225 mates only with the appropriate planar electrical connector 230. Modification of the length, depth, and width of the cavity 370, as well as the size and shape of the notches 370a, can also ensure that the planar connection interface 225 mates only with the appropriate planar electrical connector 230.

In at least one implementation, there can also be one or more releasable extensions 375 inside the cavity 370. The releasable extensions 375 can releasably secure a planar electrical connector 230 within the cavity 370 of the planar connection interface 225. For example, the releasable extensions 375 can extend into one or more openings within a planar electrical connector, as discussed above. The releasable extensions 375 can be fixed, such as bumps or notches that are configured to provide greater resistance when removing or inserting a planar electrical connector 230 into the planar connection interface 370. Alternatively, the releasable extensions 375 can be movable. For example, the releasable extensions 375 can include a spring loaded mechanism (not shown) such that, upon insertion of a planar electrical connector 230, the releasable extensions 375 push into place within the openings 320 of a planar electrical connector 230.

Just as with openings 320 in connectors 230, the size, shape, placement and number of releasable extensions 375 in planar connection interface 225 can also be configured to ensure that only the appropriate planar electrical connector mates with the planar connection interface 225. For example, the shape of the releasable extensions 375 can be round if the planar connection interface 225 can mate with the planar electrical connector 230a of FIG. 3A. Alternatively, the releasable extensions 375 can be rectangular if the planar connection interface 225 is configured to mate with the planar electrical connector 230b of FIG. 3B. Similarly, there can be more or fewer extensions 375 than those particularly illustrated in FIG. 3C.

In at least one implementation, the planar connection interface 225 further includes tabs 380 for releasing the planar electrical connector. In one implementation, the tabs 380 can connect to the releasable extensions 375. This connection between tabs 380 and extensions 375 can, in turn, allow a user to push or pull the tabs 380 to thereby remove the releasable extensions 375 from the openings in the planar surface of a planar electrical connector 230. Once the releasable extensions 375 have been removed from the openings in the planar surface of a planar electrical connector 230, a user can then remove the planar electrical connector 230 from the cavity 370 of the planar connection interface 225.

Accordingly, FIGS. 1-3C, and the corresponding text, illustrate or describe a number of components, modules, and mechanisms that can be used to provide electric power directly to access points without necessarily requiring the use of zone boxes. In addition to the foregoing, implementations of the present invention can also be described in terms of one or more acts in a method for accomplishing a particular result. For example, FIG. 4 illustrates a flowchart of acts of a method of providing electric power from a main input to a plurality of access points in a plurality of spaces without requiring the use of one or more intervening zone boxes.

Figure 4:
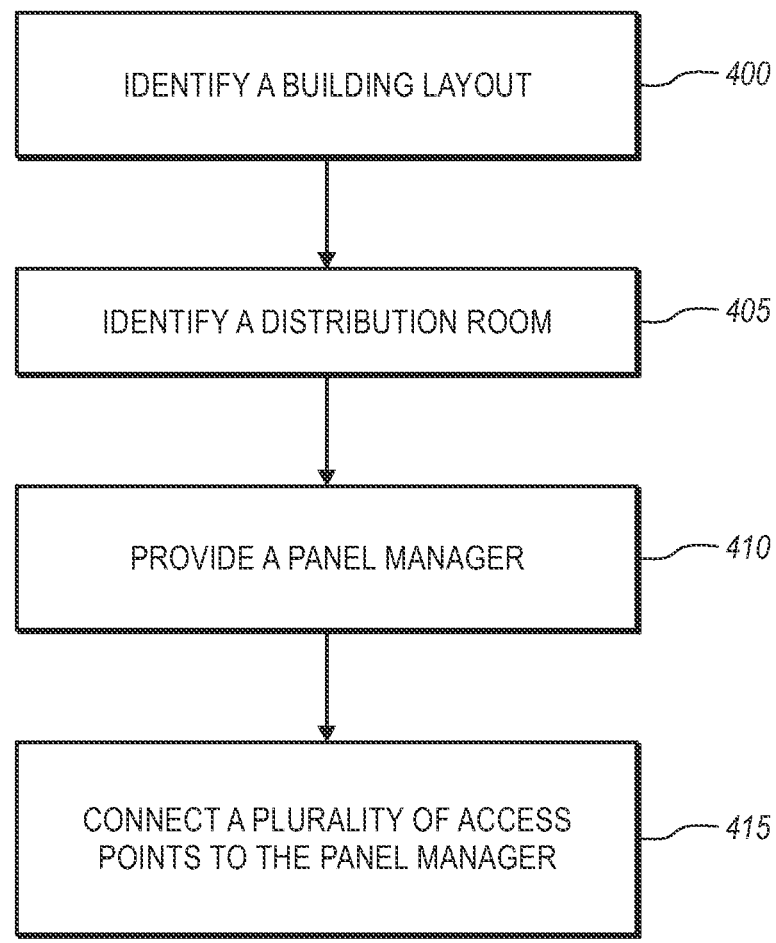
FIG. 4 is a flowchart illustrating a sequence of acts in a method in accordance with an implementation of the present invention of distributing electric power to a plurality of access points in a plurality of spaces using a centralized panel manager.

FIG. 4 shows that a method of providing electric power can comprise an act 400 of identifying a building layout. Act 400 can comprise identifying a building layout comprising a plurality of spaces. For example, a product manager obtains or prepares an electrical layout for a particular building space, such as shown in FIG. 1. The electrical layout includes at the very least one or more access points 135 in corresponding one or more spaces 140 to which a panel manager 115 will need to configure delivery of electrical power.

FIG. 4 also shows that the method of providing electric power can comprise an act 405 of identifying a distribution room. Act 405 can comprise identifying a single distribution room for distributing power to each of the plurality of spaces in the building layout. For example, FIG. 1 shows a distribution room 105 (or centralized distribution room) in the electrical layout 100. The distribution room includes 105 includes an electric power source 110 that can provide the power to be distributed.

In addition, FIG. 4 shows that the method of providing electric power can comprise an act 410 of providing a panel manager. Act 410 can include providing a panel manager in a distribution room, wherein the panel manager comprises one or more planar connection interfaces for providing electric power to the plurality of spaces. For example, FIGS. 1 and 2 show the use of a panel manager 115 for providing electric power to a plurality of spaces 140. The panel manager 115 includes planar connection interfaces 225 for providing electric power to a plurality of access points 135 within a plurality of spaces 140.

Furthermore, FIG. 4 shows that the method can comprise an act 415 of connecting a plurality of access points to the panel manager. Act 415 can include connecting a plurality of access points in the plurality of spaces directly to the panel manager, and without use of any intervening zone boxes, whereby the panel manager can supply electric power directly to each access point. For example, FIG. 1 shows an electrical layout 100, wherein a plurality of access points 135 in a plurality of spaces 140 are connected "directly" to a panel manager 115 (i.e., without use of intervening zone boxes).

Accordingly, FIGS. 1-4 and the corresponding text illustrate or describe devices, apparatus and methods for providing electric power to a plurality of spaces using a panel manager. The panel manager can provide power without requiring the use of zone boxes. Eliminating zone boxes can eliminate the amount of materials used, thus reducing the cost of construction or remodeling. Additionally, the use of a panel manager can also allow for future changes in the electrical layout in the plurality of spaces with relative ease. Further, the use of a panel manager for providing power to a plurality of spaces can provide a clear demarcation between base building and tenant improvements, thus simplifying both budget and tax analyses.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a construction environment in which electric power is to be provided from a main input source to a plurality of spaces, a method of providing electric power from the main input to a plurality of access points in the plurality of spaces without requiring the use of one or more intervening zone boxes, the method comprising:
   identifying a building layout comprising a plurality of spaces;
   identifying a single distribution room for distributing power to each of the plurality of spaces in the building layout;
   providing a panel manager in the single distribution room, wherein the panel manager comprises at least one connection interface configured to provide electric power directly to two or more spaces of the plurality of spaces; and
   connecting a plurality of access points in the plurality of spaces directly to the panel manager, and without use of any intervening zone or junction boxes, whereby the panel manager can supply electric power directly to multiple access points of the plurality through a single connection interface.

2. The method as recited in claim 1, wherein connecting athe plurality of access points in the plurality of spaces directly to the panel manager further comprises:
   mating an electrical connector to the at least one connection interface in the panel manager;
   wherein the electrical connector is connected to the panel manager on one end, and directly to a plurality of access points on an opposing end.

3. The method as recited in claim 2, further comprising:
   providing a second panel manager in the single distribution room;
   wherein the second panel manager comprises one or more planar connection interfaces configured to provide electric power to the plurality of spaces.

4. The method as recited in claim 2, further comprising:
   connecting an electric wire to an input of an electric splitter, wherein the electric splitter includes one or more outputs;

wherein an output of the electric splitter is connected directly to one of the access points in the plurality.

5. The method as recited in claim 1, further comprising:
connecting a plurality of electric wires to an electrical connector;
wherein the plurality of electric wires is connected directly to a corresponding plurality of access points, and is configured to deliver electric power from the electrical connector directly to the corresponding plurality of access points.

6. The method as recited in claim 1, further comprising:
connecting a plurality of electric wires to a second electrical connector; and
plugging the second electrical connector into a corresponding second connection interface in the panel manager;
wherein the plurality of electric wires of the second electrical connector is connected directly to main power through the combination of the second electrical connector and second connection interface.

7. A method of providing electric power from a main input to a plurality of access points in a modular construction without requiring the use of one or more intervening zone boxes for each space, the method comprising:
constructing a building layout comprising a plurality of spaces, wherein each space comprises at least one electrical access point;
providing a single distribution room, and a panel manager in the distribution room;
electrically connecting two or more wires from two or more electrical access points in the plurality of spaces directly to a single electrical connector, and without use of any intervening zone or junction boxes;
securing the single electrical connector to a single electrical connection interface in the panel manager positioned in the distribution room;
wherein the panel manager is configured to supply power from a main power input directly to the two or more access points through the single connection interface.

8. The method as recited in claim 7, further comprising connecting a second set of one or more wires corresponding to one or more additional access points in the plurality of spaces directly to a second electrical connector.

9. The method as recited in claim 8, further comprising securing the second electrical connector to a second electrical connection interface in the panel manager.

10. The method as recited in claim 9, wherein the panel manager sends power directly to a number of electrical access points using two or more electrical connection interfaces that are less than the number of electrical access points.

11. The method as recited in claim 7, wherein the panel manager is configured to:
receive main power on one side thereof; and
distribute power to the plurality of spaces on an opposing or adjacent side thereof.

12. The method as recited in claim 7, wherein the two or more access points correspond to two or more spaces in the plurality of spaces.

13. The method as recited in claim 7, wherein:
the two or more access points correspond to two or more spaces in the plurality of spaces; and
the panel manager provides power to the two or more spaces through the same connection interface.

14. The method as recited in claim 7, wherein at least the single electrical connector comprises one or more interfaces configured to reciprocally mate with one or more interfaces in the connection interface of the panel manager.

15. The method as recited in claim 14, wherein the single electrical connector and the single connection interface of the panel manager comprise one or more releasable extensions configured to releasably secure the electrical connector to the connection interface in the panel manager.

16. The method as recited in claim 15, wherein at least the single electrical connector comprises a planar interface configured to receive power from the single electrical connection interface on one end, and deliver power to a plurality of wires on an opposing end.

17. A method of providing electric power from a main input to a plurality of access points in a modular construction without requiring the use of one or more intervening zone boxes for each space, the method comprising:
constructing a building layout comprising a plurality of spaces, wherein each space comprises at least one electrical access point;
providing a single distribution room, and a panel manager in the distribution room;
electrically connecting two or more wires from two or more electrical access points in the plurality of spaces directly to a single electrical connector, and without use of any intervening zone or junction boxes;
securing the single electrical connector to a single electrical connection interface in the panel manager positioned in the distribution room;
wherein:
the panel manager houses at least the single electrical connector interface within a terminal assembly; and
the panel manager is configured to supply power from a main power input directly to the two or more access points through the single connection interface.

18. The method as recited in claim 17, wherein the terminal assembly joins a main power input directly to one or more electrical connection interfaces, including at least the single electrical connection interface.

19. The method as recited in claim 17, further comprising attaching one or more splitters to the two or more access points.

20. The method as recited in claim 19, wherein:
the two or more access points deliver power from the panel manager to one or more of the plurality of spaces; and
the one or more splitters deliver power within the one or more spaces to one or more outlets.

* * * * *

UNITED STATES PATENT AND TRADEMARK OFFICE
CERTIFICATE OF CORRECTION

PATENT NO. : 8,500,480 B2
APPLICATION NO. : 13/453774
DATED : August 6, 2013
INVENTOR(S) : van Beveren et al.

It is certified that error appears in the above-identified patent and that said Letters Patent is hereby corrected as shown below:

In the Specification

Column 1
Line 7, change "Continuation" to --continuation--
Line 35, change "electrical engineers circuited drawings" to --electrical engineers' circuit drawings--

Column 4
Line 8, change "FIG. 3A or 3B" to --FIGS. 3A or 3B--

Column 8
Line 60, change "gold silver" to --gold, silver--

Column 9
Line 51, change "planar electrical 230a connector" to --planar electrical connector 230a--

Column 10
Line 38, change "connector 230" to --connector 230 (*a, b*)--
Line 58, change "connection interface 370" to --connection interface 225--
Line 60, change "spring loaded mechanism" to --spring-loaded mechanism--

Column 11
Line 48, change "distribution room includes 105 includes" to --distribution room 105 includes--

In the Claims

Column 12
Line 51, change "athe plurality" to --the plurality--

Signed and Sealed this
Third Day of December, 2013

Margaret A. Focarino
*Commissioner for Patents of the United States Patent and Trademark Office*